(12) United States Patent
Klever

(10) Patent No.: US 8,607,610 B2
(45) Date of Patent: Dec. 17, 2013

(54) APPARATUS AND METHOD FOR SUPPORTING TUBES IN EXTRUSION LINES

(75) Inventor: Jörg Klever, Halle (DE)

(73) Assignee: Inoex GmbH (DE)

( * ) Notice: Subject to any disclaimer, the term of this patent is extended or adjusted under 35 U.S.C. 154(b) by 632 days.

(21) Appl. No.: 12/788,977

(22) Filed: May 27, 2010

(65) Prior Publication Data

US 2010/0300172 A1 Dec. 2, 2010

(30) Foreign Application Priority Data

May 30, 2009 (DE) .......................... 10 2009 023 438

(51) Int. Cl.
*B21C 35/00* (2006.01)
*B23Q 7/00* (2006.01)

(52) U.S. Cl.
USPC .................................. 72/257; 72/422; 29/559

(58) Field of Classification Search
USPC .............. 29/559, 468; 72/257, 419, 428, 426, 72/422, 420, 270, 405.01, 405.02, 405.06; 425/377, 182; 74/490.01, 490.05, 74/490.07; 59/78
See application file for complete search history.

(56) References Cited

U.S. PATENT DOCUMENTS

| | | | | |
|---|---|---|---|---|
| 3,351,034 A | * | 11/1967 | Grek | ................................ 72/332 |
| 7,444,742 B2 | * | 11/2008 | Sturm et al. | .................... 29/712 |
| 2008/0305198 A1 | | 12/2008 | Ulrich | |

FOREIGN PATENT DOCUMENTS

| | | |
|---|---|---|
| DE | 102004059515 | 5/2006 |
| DE | 102005028086 | 12/2006 |
| DE | 102005031980 | 4/2007 |
| DE | 102007007196 | 8/2008 |

* cited by examiner

*Primary Examiner* — Dana Ross
*Assistant Examiner* — Mohammad Nourbakhsh
(74) *Attorney, Agent, or Firm* — Robert W. Becker; Berenbaum Weinshienk PC

(57) ABSTRACT

A tube support mechanism is adaptable to a respective tube diameter being transported, and includes an articulated link chain that rests against a circumference of a tube, and includes chain links. The chain links are disposed in at least two planes, overlap one another from plane to plane in overlap zones, and are pivotably connected. Facing ends of the chain links of a given plane of chain links have identical gear wheel contours that mesh with one another. Adjustment of the tube support mechanism from one nominal diameter to another is effected by a pressure effect, onto the tube support mechanism, of a conical tube transition piece that results during the change in diameter during continuing operation. An angle of contact of the tube support mechanism against a tube successively changes.

7 Claims, 11 Drawing Sheets

US 8,607,610 B2

APPARATUS AND METHOD FOR SUPPORTING TUBES IN EXTRUSION LINES

The instant application should be granted the priority date of 30 May 2009 the filing date of the corresponding German patent application 10 2009 023 438.1.

BACKGROUND OF THE INVENTION

The present invention relates to an apparatus and a method for supporting tubes in extrusion lines. The apparatus has a tube support mechanism that is adaptable to a respective tube diameter that is to be transported, and that is provided with an articulated link chain that rests against at least part of a circumference of a tube, with the chain links of the articulated link chain having end faces that are directed toward the tube. The method provides for the adjustment of a tube support mechanism of an extrusion line that is designed for a change in dimension during continuing operation.

An apparatus of the aforementioned type is known from DE 10 2007 007 196 A1. The individual links of this link chain have a support surface, which during operation rests against an extruded tube, and a wedge surface that is disposed across from the support surface. The wedge surfaces are respectively supported against counter wedge surfaces of a base frame. To adapt to the transported tube dimension, the wedge surfaces are displaceable on the counter wedge surfaces, so that on the whole the link chain is displaced radially. In the region of the longitudinal sides of their support surfaces, the links are hingedly interconnected via film hinges or piano bands.

With the above described apparatus, the adjustment of the tube support mechanism from one nominal diameter to another nominal diameter during continuing operation of the extrusion line is effected by actively driving the tube support mechanism, e.g. by a motor. This is also applicable, for example, with the apparatus known from DE 10 2005 028 086 A1 and DE 10 2004 059 515 B3.

WO 2004/106034 describes a combination roll for the tube support mechanism which is equipped with means, in particular spring means, which ensure that as the load from the tube that is to be supported increases, the roll is moved downwardly and reversed. This solution has the drawback that an optimum support is provided only for one respectively determined tube diameter. Therefore, a plurality of rolls having varying geometry are disposed one after the other.

It is an object of the present invention to provide a further apparatus of the aforementioned general type for the adjustment of tube support mechanisms.

SUMMARY OF THE INVENTION

This object is inventively realized by an apparatus for supporting tubes in extrusion lines that comprises a tube support mechanism that is adaptable to a respective tube diameter that is to be supported, wherein the tube support mechanism is provided with at least one articulated link chain configured to rest against at least part of the circumference of a tube being transported, wherein the link chain is comprised of chain links having end faces directed toward the tube being transported, the chain links being disposed in at least two planes and overlapping one another from plane to plane in overlap zones, with the chain links being pivotably connected to one another in the overlap zones, and with facing ends of the chain links of a given plane being provided with identical gear wheel contours that mesh with one another.

The object of the present invention is also realized by a method of adjusting a tube support mechanism of an extrusion line that is designed for a change in dimension during continuing operation, the method including the step of effecting adjustment of the tube support mechanism from a first nominal diameter to a second nominal diameter by means of a pressure effect, onto the tube support mechanism, of a conical tube transition piece that results during the change in diameter, wherein an angle of contact of the tube support mechanism against a tube being supported successively changes.

The gear wheel contours, which are provided at the ends of the chain links, and which mesh with one another, ensure that the angular positions of the individual chain links relative to one another during the adjustment change identically. As a result, it is possible to adapt the articulated link chain to different tube diameters, whereby the contact angle changes such that with larger tube diameters it is less, and with smaller tube diameters it is greater. In this connection, an extruded tube is to be supported over at least 120° of its circumference.

Since the individual chain links are interconnected in the manner of a gear mechanism, it is sufficient if a respective support engages a chain link that is disposed to the left and to the right of the low point of the articulated link chain. In this connection, the support of the articulated link chain can be set to the respective tube diameter that is to be transported automatically or in a positively controlled manner. If the chain between the support points is heavier than between the support points and the ends of the chain, the articulated link chain is automatically adjusted or displaced under the effect of gravity to a smaller diameter, if, for example, in the extrusion line a conversion is to take place from a larger diameter to a smaller diameter. With a dimension change during continuing operation, there results between a previously transported large nominal diameter and a smaller nominal diameter that is to be subsequently transported a conical transition piece with a diameter that becomes smaller, so that the articulated link chain automatically successively "closes" under the effect of gravity. In the reverse situation, in other words during a transition from a smaller transported tube diameter to a larger tube diameter that is to be transported, the similarly conical transition piece, due to the diameter that then becomes greater, presses the articulated link chain apart counter to the force of gravity, so that the chain is automatically set to the new diameter. Instead of this automatic setting of the articulated link chain, it is also possible to provide a positively-controlled adjustment of the articulated link chain, for example by configuring at least one of the supports as an actuator, e.g. as a hydraulic cylinder.

In the simplest case, the end faces of the chain links that face the extruded tube form a sliding surface for the tube, i.e. the extruded tube rests directly upon the chain links.

To reduce the friction between the tube support mechanism and the extruded tube, pursuant to one advantageous embodiment of the invention, the articulated link chain is equipped with rollers, so that instead of the sliding friction, a rolling friction is present. This also has the advantage that the tube support mechanism is more easily pressed apart during transition from a smaller diameter that is to be transported to a larger diameter that is to be transported.

BRIEF DESCRIPTION OF THE DRAWINGS

The invention will be explained in greater detail subsequently with the aid of exemplary embodiments shown in the accompanying drawings, in which.

DESCRIPTION OF SPECIFIC EMBODIMENTS

Figure 1:
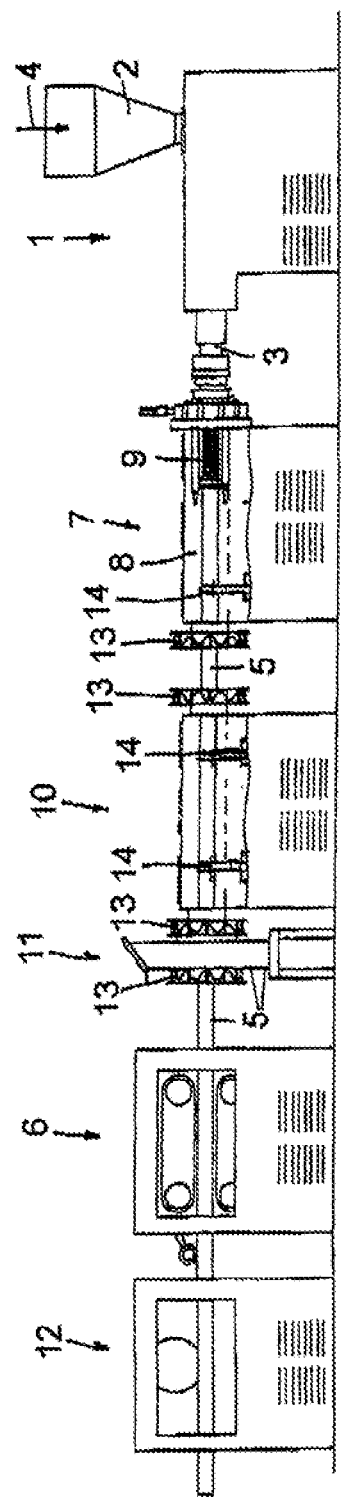
FIG. 1 is a side view of a tube extrusion line.
Figure 2:
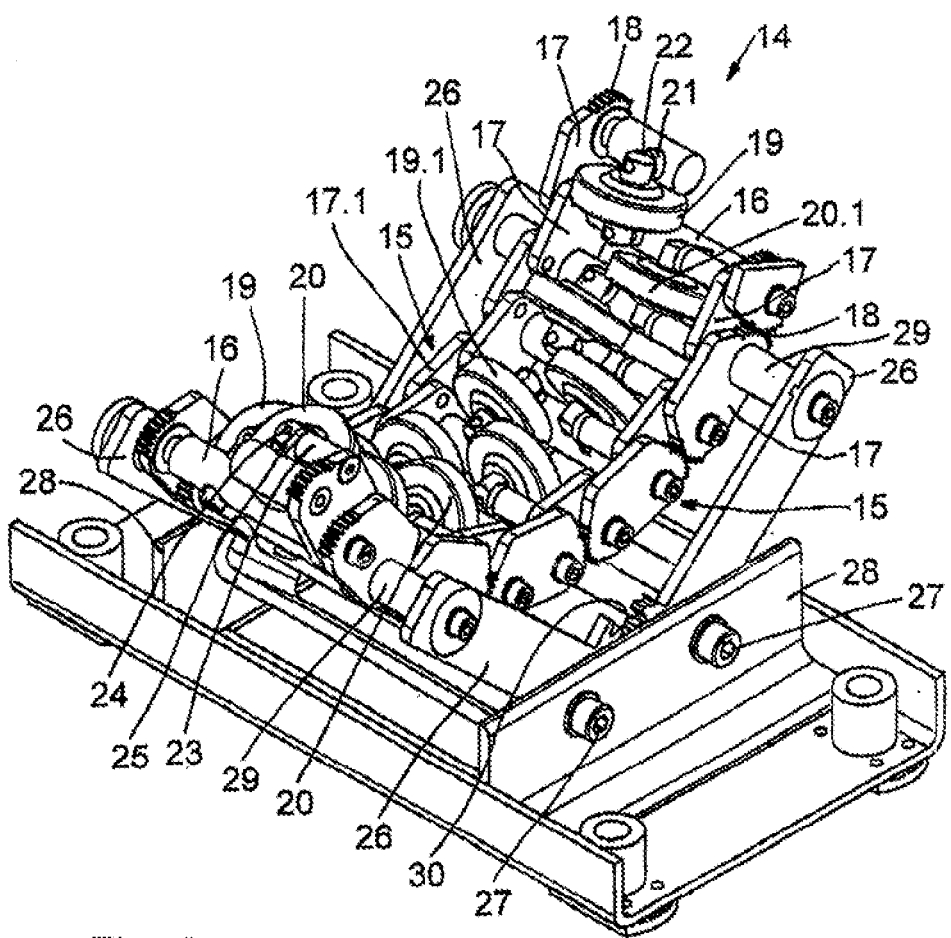
FIG. 2 is a perspective view of an inventive apparatus pursuant to a first embodiment of the invention, whereby the apparatus is set to a large tube diameter.
Figure 3:
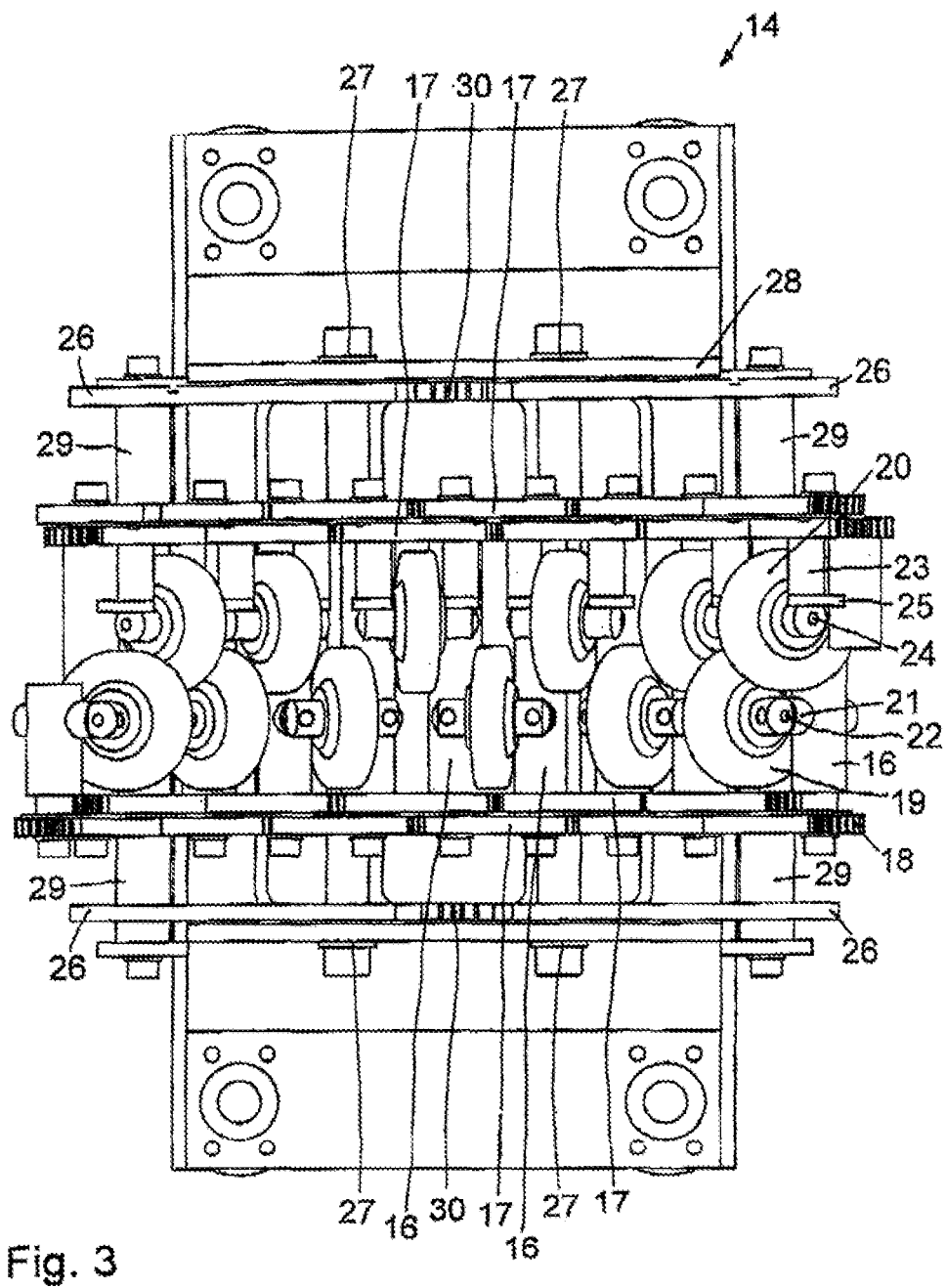
FIG. 3 is a plan view onto the illustration of FIG. 2.
Figure 4:
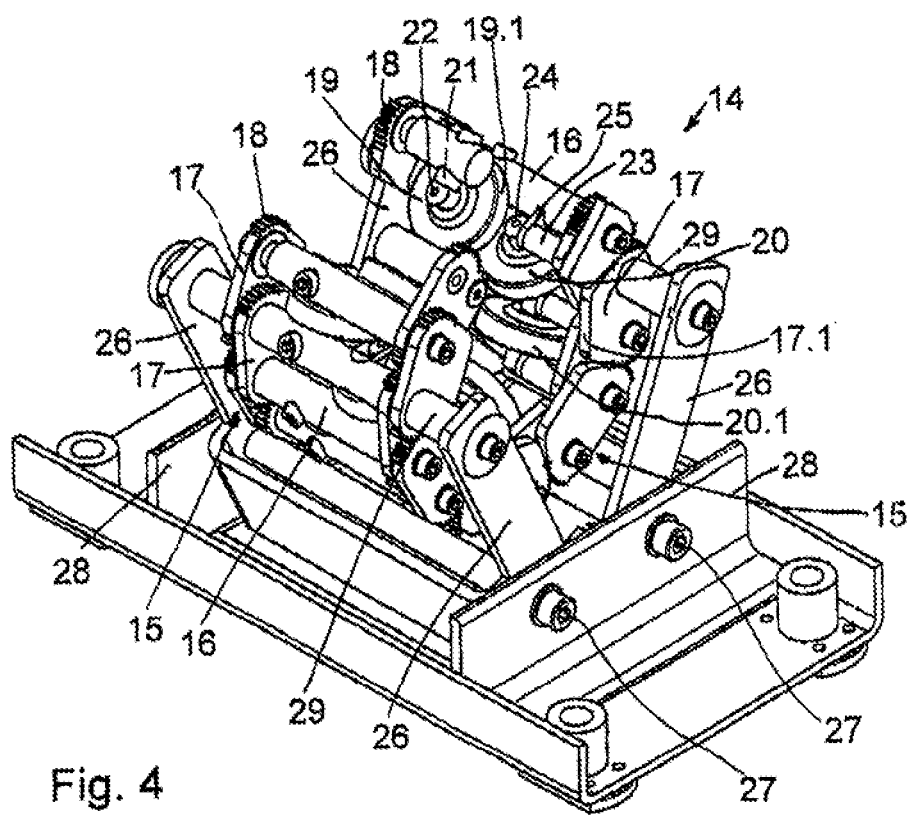
FIG. 4 is an illustration according to FIG. 2 of an apparatus set to a smaller tube diameter.
Figure 5:
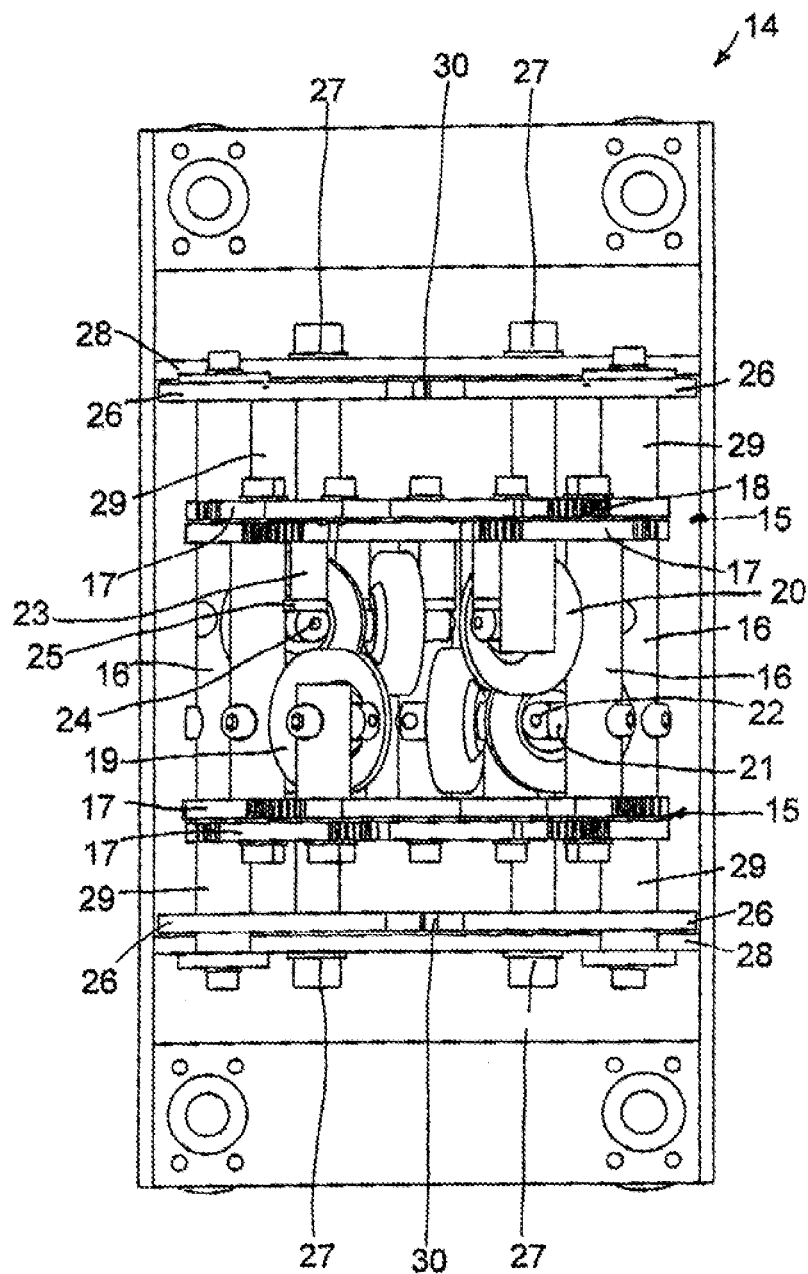
FIG. 5 is a plan view onto the illustration of FIG. 4.
Figure 6:
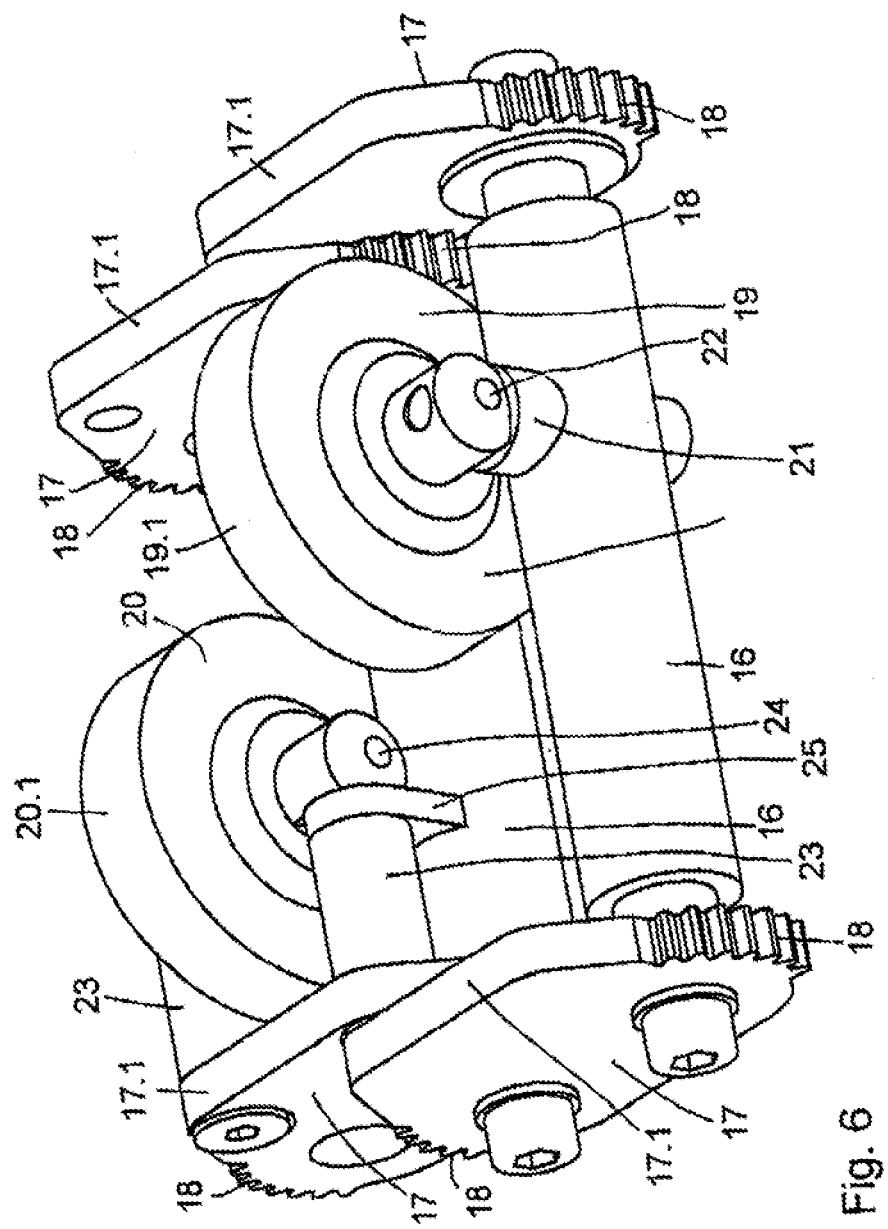
FIG. 6 is an enlarged detail view of the illustration of FIGS. 2 to 5 showing two overlapping chain links.
Figure 7:
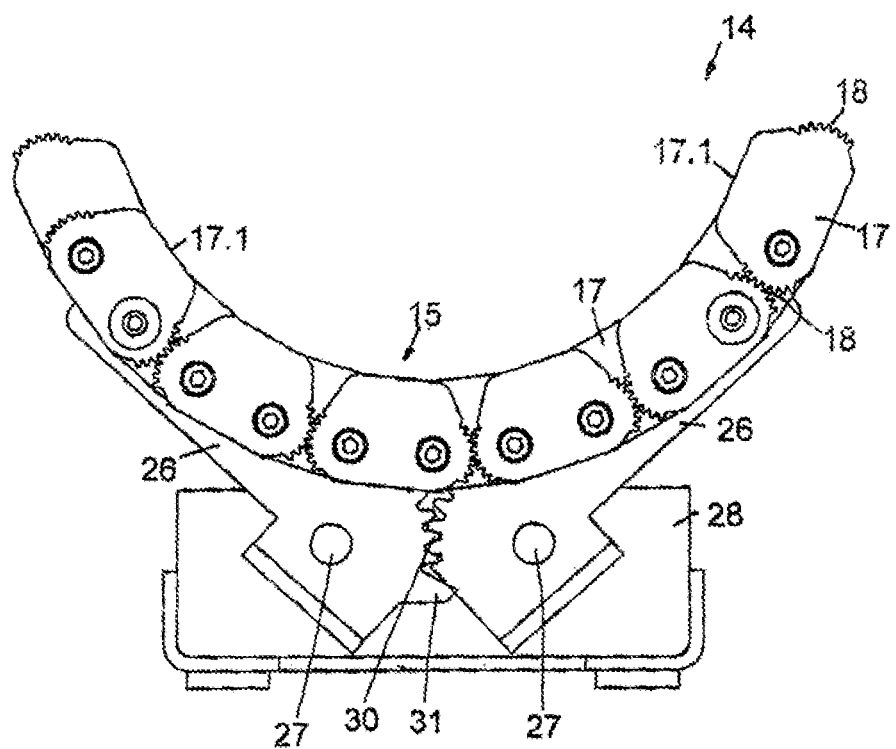
FIG. 7 is a front view of an apparatus pursuant to a second embodiment of the invention, whereby the apparatus is set to a large tube diameter, and the front support arms of the apparatus have been omitted.
Figure 8:
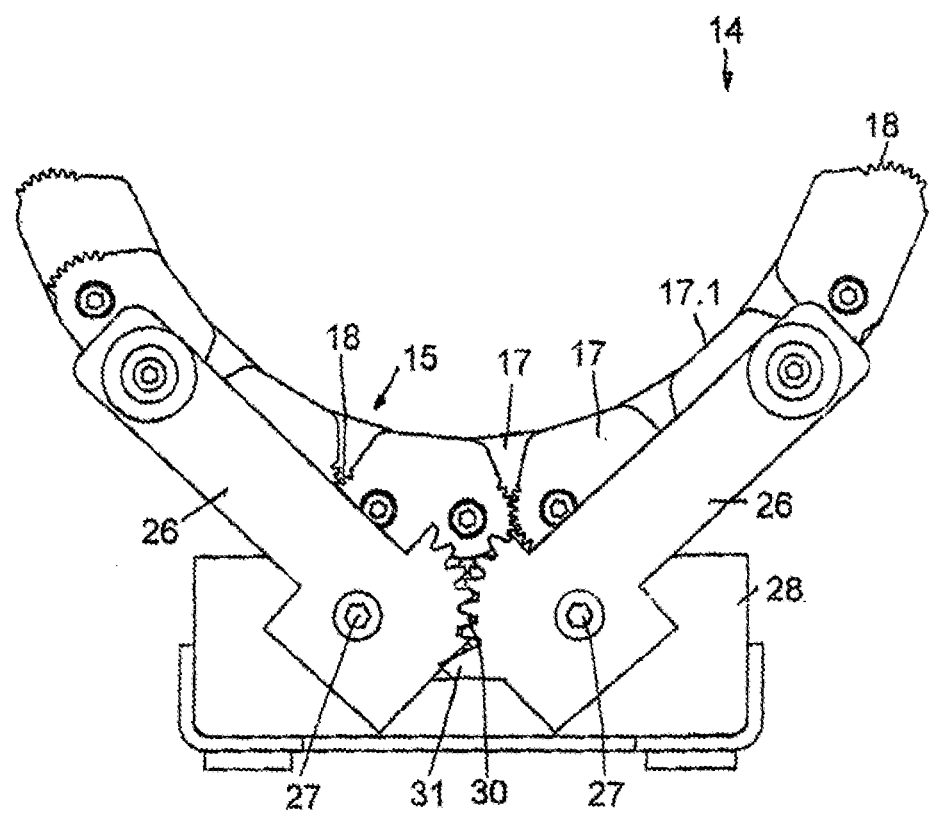
FIG. 8 is an illustration according to FIG. 7 with the front support arms illustrated.
Figure 9:
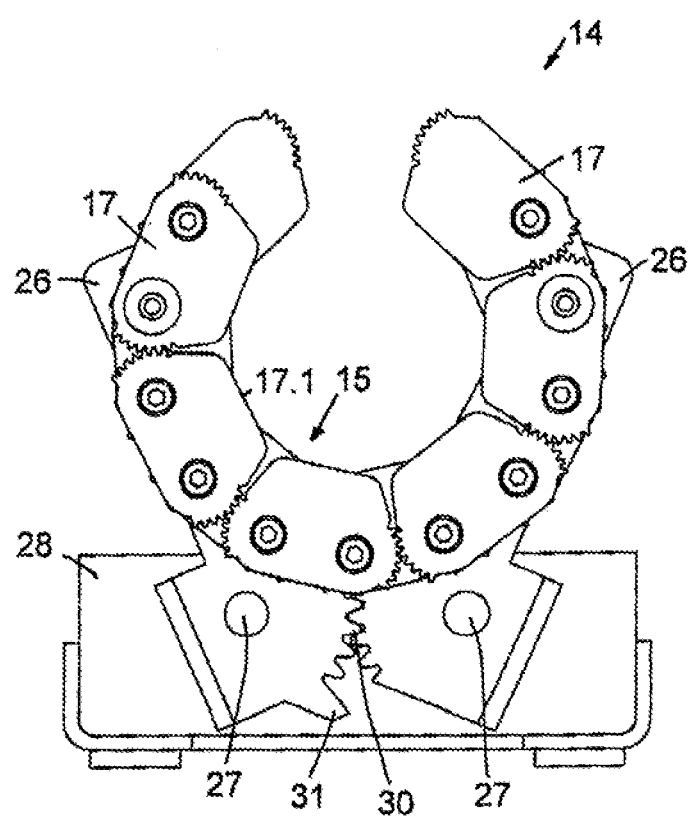
FIG. 9 is an illustration according to FIG. 7 with the apparatus set to a smaller tube diameter.
Figure 10:
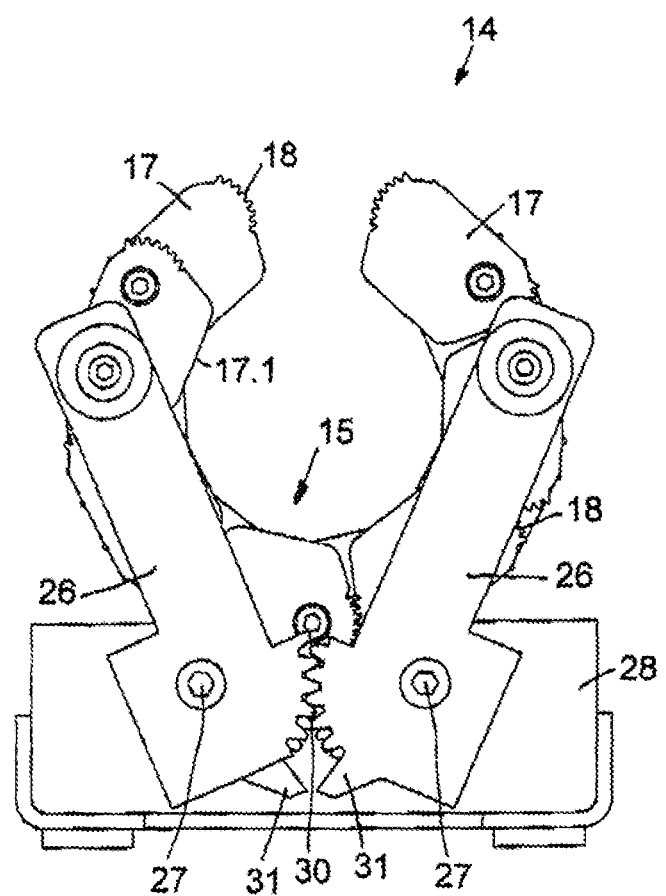
FIG. 10 is an illustration according to FIG. 9 with the front support arms illustrated.

The extrusion line illustrated in FIG. 1 includes an extrusion unit 1 with a feed hopper 2, and a non-illustrated extruder worm with a tube or pipe head 3. A thermoplastic polymeric material 4 in granular or powder form is supplied to the extrusion unit 1 via the feed hopper 2. The granular or powder material is heated, kneaded and plasticized in the extrusion unit. Subsequently, the polymeric material 4, as moldable mass, is conveyed by the extruder worm into the tube head 3, where it is pressed through a ring-shaped discharge gap.

After being discharged from the tube head 3, the hot, still moldable or deformable tube or pipe 5 is pulled by means of a caterpillar-type withdrawal mechanism 6, which is disposed at the end of the extrusion line, through a calibration and cooling unit 7, which is provided with a vacuum tank 8 having a calibration sleeve 9 disposed at its inlet. In the calibration sleeve 9, the diameter of which can be infinitely adjusted, the desired diameter of the extruded and still moldable tube 5 is established. After leaving the calibration and cooling unit 7, the tube 5 enters a cooling stretch 10, in which it is cooled to room temperature. Disposed between the cooling stretch 10 and the caterpillar-type withdrawal mechanism 6 is an ultra-sound scanner 11 for detecting the diameter and the wall thickness of the extruded tube 5. Adjoining the withdrawal mechanism 6 is a separator or cut-off saw 12 for cutting the tube 5 to length. Furthermore, seals 13 are provided in the tube extrusion line for surrounding the tube 5 that extends through in a sealing manner.

Since the extruded tube 5 is cured or hardened, i.e. is rigid or inherently stable, only after leaving the cooling stretch 10, it must previously be supported in order to prevent a sagging and hence a deformation. For this purpose, one tube support mechanism 14 is provided in the calibration and cooling unit 7, and two tube support mechanisms 14 are provided in the cooling stretch 10; the construction and manner of operation of the tube support mechanisms will be described in greater detail subsequently with the aid of FIGS. 2 to 10, which show two different embodiments of the invention.

The tube support mechanism 14 shown in FIGS. 2 to 6 has two articulated link chains 15, which are spaced apart, parallel to one another, by link pins 16. Each articulated link chain 15 is provided with chain links 17 that are disposed in two planes and that overlap from plane to plane. The link pins 16 have a reduced diameter in the overlap zones, as can be best seen from FIG. 6, and form the hinged connections between the chain links 17 in their overlap zones. The chain links 17 of each plane are provided at their ends that face one another with identical gear wheel contours 18, whereby the chain links 17 of the same plane mesh with one another.

Disposed between the two articulated link chains 15 are two rows of rollers 19 and 20 respectively, whereby the rollers 19 of one row are staggered relative to the rollers 20 of the other row. In this way, the rollers 19 are always disposed in the region of the gear wheel contours 18 of the inner chain links 17, in other words, between these inner chain links and the rollers 20, which are respectively disposed centrally relative to their inner chain links 17. This arrangement requires different mountings of the rollers 19 and 20. For example, due to their changing angular position between two adjacent chain links 17 during the shifting or adjustment of the tube support mechanism 14, the rollers 19 cannot be mounted directly on these chain links 17. The rollers 19 are therefore mounted on the link pins 16, as can be best seen from FIG. 6. For this purpose, studs or support pins 21 extend perpendicularly upwardly from each two adjacent link pins 16; the pivot shafts 22 of the rollers 19 are mounted on the support pins. The rollers 20 are mounted directly on the associated chain link 17. For this purpose, studs or support pins 23 that are disposed parallel to the link pins 16 extend inwardly from the chain links 17; the pivot shafts 24 of the rollers 20 are mounted on the support pins. Since the rollers 20, as well as the rollers 19, are subjected to pressure by the tube 5 that is to be supported, the support pins 23, which are thereby subjected to bending, are supported against the stable link pins 16 by means of support legs 25 provided on the ends of the support pins.

The rollers 19 and 20 are mounted in such a way that they extend upwardly beyond the end faces 17.1 of the chain links 17. As a result, the peripheral surfaces 19.1 and 20.1 serve as roller surfaces for the tube 5 that is to be supported in the extrusion line.

In addition to the components described above, the tube support mechanism 14 is furthermore provided with two pairs of support arms or brackets 26, which at their lower ends are pivotably mounted on bearing plates 28 via swivel joints 27. The upper end of the support arms 26 are connected in a swiveling manner with the respectively second to last chain links 17 of the articulated link chains 15 via spacers 29.

In the region of their lower ends, the support arms 26 are respectively provided with a gear wheel contour 30 that is disposed concentrically relative to the swivel joints 27. These gear wheel contours 30 mesh with one another. This ensures that the two support arms 26 always move synchronously. These gear wheel contours 30, which have an identical configuration with all of the embodiments, can best be seen from the illustrations of FIGS. 7 to 10. It is also visible from these illustrations that on one of the support arms 26, the last tooth 31 of the gear wheel contour 30 is longer than the other teeth. In this way, it forms an abutment with the associated other support arm 26. This abutment establishes the maximum opening angle between the support arms 26. This angle is defined such that even with the maximum tube diameter that can be transported on the extrusion line, a minimum contact angle of the tube periphery by the tube support mechanism 14 of at least 120° is ensured.

The manner of operation of the above-described tube support mechanism 14 will be described subsequently for changeovers of the tube extension line from one nominal diameter to another nominal diameter of a tube 5 that is to be produced as operation continues.

The starting point is the maximum tube diameter that can be transported on the extrusion line. The tube support mechanism 14 then has the setting illustrated in FIGS. 2 and 3. As can be seen in conjunction with FIGS. 7 and 8, the abutments 31 of the support arms 26 rest against the respectively associated other support arm 26. This setting guarantees that the tube 5 that is to be supported is supported along a partial circumference of 120°. The extruded tube 5 rests upon the rollers 19 and 20, and has from them an adequate support during rolling friction.

If the extrusion line is now to be set to a smaller nominal diameter of a tube 5 that is to be produced and transported, a conical transition piece results as the diameter successively decreases. The tube support mechanism 14 automatically follows this change in diameter until it is ultimately set to the smaller diameter that is to be transported. This automatic adaptation is brought about by the effect of gravity. This is because the chain links 17, link pins 16, rollers 19 and 20, etc., which are disposed between the support points of the support arms 26, have a considerably greater overall weight than do the components of the tube support mechanism 14 that join the support points toward the outside. Due to this difference in weight, the support arms 26 are pivoted toward one another, i.e. the tube support mechanism 14 closes up somewhat and surrounds the smaller diameter extruded tube over a larger contact angle, as can be seen from the illustration of FIG. 4 in conjunction with the illustrations of FIGS. 9 and 10. When the extrusion line is again converted to a larger diameter, a conical tube transition piece again results between the smaller diameter and the larger diameter that is to be transported, but this time with the opposite conicity, i.e. the diameter increases successively. Due to this increase in diameter, the tube support mechanism 14 is successively opened counter to the effect of gravity until the new nominal diameter of the tube 5 is reached. Thus, also here the tube support mechanism 14 is automatically adapted to the new tube diameter that is to be transported.

A further embodiment of the invention is explained in FIGS. 7 to 10. This embodiment differs from the previous embodiment in that the rollers 19, 20, and their corresponding mounting components, have been eliminated. With this apparatus, an extruded tube 5 rests directly upon the end faces 17.1 of the chain links 17 under the effect of sliding friction. Pursuant to another embodiment of the invention, instead of two articulated link chains 15 that are spaced from one another, only a single articulated link chain 15 having chain links 17 that are disposed in at least two planes can be used. In so doing, it can be sufficient, with chain links 17 disposed in only a few planes, to provide the support arms 26 on only one side, i.e., relative to the plane of the drawing, ahead of or behind the articulated link chain 15.

Instead of the automatic adjustment of the tube support mechanism 14, a positively-controlled adjustment can also be provided. In such a case, e.g. instead of the support arms 26, active elements, e.g. hydraulic pistons, must be used for actively adjusting the articulated link chain or chains 15.

Figure 11:
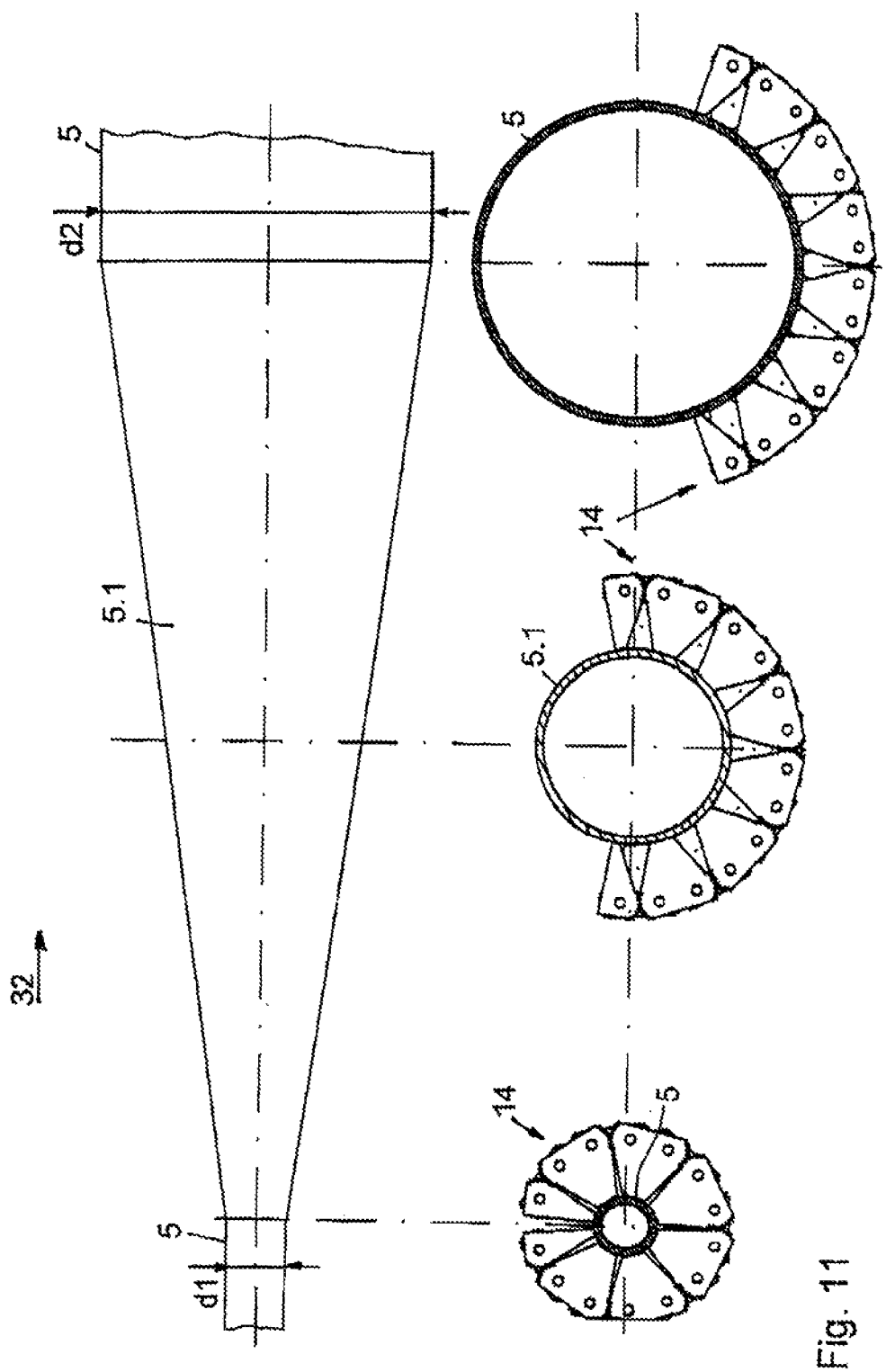
FIG. 11 illustrates the principle of the adjustment of the tube support mechanism.

FIG. 11 schematically illustrates the procedure during the adjustment of the tube support mechanism 14. With this embodiment, as the operation continues, the extrusion line is converted from the smallest nominal diameter d1 that is to be transported to the largest nominal diameter d2 that is to be transported, whereby an arrow 32 symbolizes the direction of extrusion. A conical tube transition piece 5.1 results between the two nominal diameters d1 and d2.

It can be seen from FIG. 11 that the tube support mechanism 14 completely, i.e. over 360° of its circumference, surrounds the extruded tube 5 when it has the smallest nominal diameter d1 that is to be transported. Due to the conversion to the nominal diameter d2, the diameter increases in the tube transition piece 5.1, so that the tube support mechanism 14 is successively pressed open. In FIG. 11, the middle illustration of the tube support mechanism 14 shows a transition stage, whereas the Figure on the right shows the support of the extruded tube 5 where it has the largest nominal diameter d2 that is to be transported.

If a conversion is to be made from a larger nominal diameter to a smaller nominal diameter, the tube support mechanism 14 successively closes under the effect of gravity due to the then diminishing diameter in the tube transition piece 5.1. Thus, also in this situation the tube support mechanism automatically adapts to the new nominal diameter that is to be transported.

The specification incorporates by reference the disclosure of German priority document 10 2009 023 438.1 filed 30 May 2009.

The present invention is, of course, in no way restricted to the specific disclosure of the specification and drawings, but also encompasses any modifications within the scope of the appended claims.

I claim:

1. An apparatus for supporting tubes in extrusion lines, comprising:
    a tube support mechanism that is adapted to a respective tube diameter that is being transported, wherein said tube support mechanism is provided with at least one articulated link chain configured to rest against at least part of a circumference of a tube being transported, further wherein said at least one articulated link chain is comprised of chain links having end faces directed toward the tube being transported, further wherein said chain links are disposed in at least two planes, further wherein said chain links overlap one another from plane to plane in overlap zones, further wherein said chain links are pivotably connected to one another in said overlap zones, and wherein facing ends of said chain links of a given plane of chain links are provided with identical gear wheel contours that mesh with one another.

2. An apparatus according to claim 1, wherein on opposite sides of a low point of said at least one articulated link chain, a respective support engages a chain link.

3. An apparatus according to claim 2, wherein said support of said at least one articulated link chain automatically sets, or is set in a positively controlled manner, to the respective tube diameter being transported.

4. An apparatus according to claim 1, wherein at least two articulated link chains having chain links disposed in at least two planes are spaced apart, parallel to one another, by means of link pins.

5. An apparatus according to claim 1, wherein said end faces of said chain links that are directed toward an extruded tube are embodied as sliding surfaces for said tube.

6. An apparatus according to claim 1, wherein said at least one articulated link chain is provided with rollers having pivot shafts that are disposed parallel to said chain links, and wherein said rollers extend beyond said end faces of said chain links to form rolling surfaces for an extruded tube resting against said end faces.

7. A method of adjusting a tube support mechanism of an extrusion line that is designed for a change in dimension during continuing operation, said method including the step of:

effecting adjustment of said tube support mechanism, from a first nominal diameter to a second nominal diameter, by means of a pressure effect, onto said tube support mechanism, of a conical tube transition piece that results during the change in diameter, wherein an angle of contact of said tube support mechanism against a tube being transported successively changes.

\* \* \* \* \*